United States Patent [19]
Abiko

[11] Patent Number: 4,831,570
[45] Date of Patent: May 16, 1989

[54] METHOD OF AND CIRCUIT FOR GENERATING BIT-ORDER MODIFIED BINARY SIGNALS

[75] Inventor: Shigeshi Abiko, Tokyo, Japan

[73] Assignee: Texas Instruments Incorporated, Dallas, Tex.

[21] Appl. No.: 935,465

[22] Filed: Nov. 26, 1986

[30] Foreign Application Priority Data

Dec. 23, 1985 [JP] Japan ................ 60-290093

[51] Int. Cl.$^4$ ........................ G06F 15/332
[52] U.S. Cl. .............. 364/715.01; 364/726; 364/768
[58] Field of Search ........... 364/726, 715, 786, 715.01

[56] References Cited

U.S. PATENT DOCUMENTS

| 3,731,284 | 5/1973 | Thies | 364/715 |
| 3,748,451 | 7/1973 | Ingwersen | 364/728 |
| 4,393,457 | 7/1983 | New | 364/726 |
| 4,602,350 | 7/1986 | Gray | 364/726 |

Primary Examiner—David H. Malzahn
Attorney, Agent, or Firm—William E. Hiller; N. Rhys Merrett; Melvin Sharp

[57] ABSTRACT

A method of and a circuit for generating address signals, wherein a binary index signal and a binary base address signal are stored in index and address registers, respectively, whereupon the index signal and the base address signal are added together to produce an initial output address signal representative of the arithmetic sum of the index and base address signals during an initial cycle of signal generating operation. The initial output address signal is tentatively storing in the address register and is added to the index signal to produce an output address signal differing in bit pattern from the initial output address signal during the cycle of signal generating operation immediately subsequent to the initial cycle. This output signal is likewise tentatively storing in the signal register and thereafter the index signal from the index register and the output address signal produced during each of the successive cycles of signal generating operation are added together to produce another output address signal differing in bit pattern from each of the output address signals produced during the immediately preceding cycle of signal generating operation, wherein the arithmetic sum is produced by carrying out a forward arithmetic addition from the least significant bits forward or a reverse arithmetic addition from the most significant bits backward.

14 Claims, 6 Drawing Sheets

```
MSB        LSB
    1 0 1 1
 +  0 1 1 0
1 ← 0 0 0 1
```

```
MSB        LSB
  1 0 1 1
+ 0 1 1 0
  1 1 0 0 → 1
```

```
⎧ X(0=0000.)     0 0 0 0   (FROM ADDRESS REGISTER)
⎪             + 0 0 0 1   (FROM INDEX REGISTER)
⎪ X(1=0001) ←── 0 0 0 1
⎪
⎪               0 0 0 1   (FROM ADDRESS REGISTER)
⎪             + 0 0 0 1   (FROM INDEX REGISTER)
⎨ X(2=0010) ←── 0 0 1 0
⎪    .....
⎪    .....
⎪ X(14=1110)
⎪
⎪               1 1 1 0   (FROM ADDRESS REGISTER)
⎪             + 0 0 0 1   (FROM INDEX REGISTER)
⎩ X(15=1111) ←── 1 1 1 1
```

Fig. 10a

```
⎧ X(0=0000)      0 0 0 0   (FROM ADDRESS REGISTER)
⎪             + 1 0 0 0   (FROM INDEX REGISTER)
⎪ X(8=1000) ←── 1 0 0 0
⎪
⎪               1 0 0 0   (FROM ADDRESS REGISTER)
⎪             + 1 0 0 0   (FROM INDEX REGISTER)
⎨ X(4=0100) ←── 0 1 0 0
⎪    .....
⎪    .....
⎪ X(7=0111)
⎪
⎪               0 1 1 1   (FROM ADDRESS REGISTER)
⎪             + 1 0 0 0   (FROM INDEX REGISTER)
⎩ X(15=1111) ←── 1 1 1 1
```

Fig. 10b

METHOD OF AND CIRCUIT FOR GENERATING BIT-ORDER MODIFIED BINARY SIGNALS

FIELD OF THE INVENTION

The present invention generally relates to the processing of digital signals for generating signals with bit orders or patterns modified from those of the supplied binary signals. More particularly, the present invention relates to a method of generating binary signals with the orders or patterns of bits re-arranged or shuffled on the basis of, typically, a fast Fourier transform algorithm and also to a bit-order modifiable signal processor circuit adapted to put such a method into practice.

BACKGROUND OF THE INVENTION

Digital signal processors (DSPs) are finding increasingly expanding practical applications in converting supplied analog signals into digital versions and further converting the resultant digital signals back into analog ones after the processing of the digital signals is complete. Such practical applications of digital signal processors include the processing of signals in high-speed modem circuitries for communication systems and equipment, compression of data for the analysis and synthesis of sound information using linear prediction coding technologies, analysis of signal waveforms in sound recognition systems, execution of fast Fourier transform algorithms generation and modification of signals required for various computer-aided operation control systems, and processing of data for use n computer graphics technologies.

Among these various practical applications of digital signal processing technologies, those using the fast Fourier transform algorithms outweigh other applications. One of the important demands in using the fast Fourier transform algorithms is to effectively reduce the number of addressing cycles required for the execution of the programs to carry out the algorithms. A prime object of the present invention is to meet such a demand.

SUMMARY OF THE INVENTION

In accordance with one outstanding aspect of the present invention, there is provided a method of generating binary signals comprising, (a) storing in first memory means a binary index signal consisting of a sequence of a predetermined number of bits, (b) storing in second memory means a binary base signal consisting of a sequence of the predetermined number of bits, (c) adding together the index signal and the base signal for producing an initial output signal representative of the arithmetic sum of the index and base signals during an initial cycle of signal generating operation, (d) tentatively storing the initial output signal in the second memory means and adding the initial output signal to the index signal for producing an output signal differing in bit pattern from the initial output signal during the cycle of signal generating operation immediately subsequent to the initial cycle and tentatively storing the last named output signal in the second memory means, and (e) thereafter adding together the index signal from the first memory means and the output signal produced during each of the successive cycles of signal generating operation for producing another output signal differing in bit pattern from each of the output signals produced during the immediately preceding cycle of signal generating operation, (f) the arithmetic sum being produced by carrying out a forward arithmetic addition from the least significant bits forward or a reverse arithmetic addition from the most significant bits backward.

In accordance with another outstanding aspect of the present invention, there is provided a bit-order modifiable signal generator circuit, comprising (a) an adder circuit comprising the combination of a binary multi-stage adder/subtractor and a forward-reverse selective carry propagation network, the multi-stage adder/subtractor having functions to carry out both a forward arithmetic addition from the least significant bits forward and a reverse arithmetic addition from the most significant bits backward selectively under the control of the forward/reverse selective carry propagation network, (b) an index register operable for having programmably yet fixedly stored therein a binary index signal consisting of a sequence of a predetermined number of bits, and (c) a signal register operable for having programmably yet fixedly stored therein a binary base signal consisting of a sequence of the predetermined number of bits, (d) the adder circuit being responsive to the index signal output from the index register and to a binary signal output from the signal register for producing an output signal representative of the arithmetic sum of the index signal and the signal output from the signal register during each cycle of signal generating operation, (e) the signal register being responsive to the output signal from the adder circuit for tentatively storing the output signal from the adder circuit and feeding back the signal to the adder circuit for being arithmetically added to the index signal during each cycle of signal generating operation.

BRIEF DESCRIPTION OF THE DRAWINGS

The drawbacks of the prior-art bit-order reversible address generator circuit and the features and advantages of a method according to the present invention and of a bit-order modifiable signal processor circuit to put the method into practice will be more clearly understood from the following description taken in conjunction with the accompanying drawings in which:

FIG. 10a is a view showing an example of the procedure to perform a succession of forward-carry binary additions for each interaction of the successive cycles of address generating operation in the address generator circuit shown in FIG. 8; and FIG. 10b is a view showing an example of the procedure to perform a succession of reverse-carry binary additions for each interaction of the successive cycles of address generating operation in the address generator circuit shown in FIG. 8.

DESCRIPTION OF THE PRIOR ART

Table 1 below shows a scheme in accordance with which a bit-order reversible address generation technique based on an 8-point radix-two fast Fourier transform algorithm (hereinafter referred to as FFT algorithm) is to be executed for data vectors or bit sequences x(k) of three-bit length wherein k=0, 1, 2, ... 7. In carrying out the 8-point FFT algorithm, address signals expressed in the form of three-bit sequences x(k) with normal bit orders on, for example, a time axis are converted into address signals of reversed bit orders on a frequency axis by the reversal of the order in which the bits of each of the given bit sequences in terms of time. Table 2 shows a similar scheme for bit sequences x(k) of four-bit length which are to be reversed in bit order in executing a 16-point radix-two FFT algorithm wherein k=0, 1, 2, ... 15.

TABLE 1

| x(k) | | X(k) |
|---|---|---|
| x(0 = 000) | — | X(0 = 000) |
| x(1 = 001) | — | X(4 = 100) |
| x(2 = 010) | — | X(2 = 010) |
| . | | . |
| . | | . |
| . | | . |
| x(5 = 101) | — | X(5 = 101) |
| x(6 = 110) | — | X(3 = 011) |
| x(7 = 111) | — | X(7 = 111) |

TABLE 2

| x(k) | | X(k) |
|---|---|---|
| x(0 = 0000) | — | X(0 = 0000) |
| x(1 = 0001) | — | X(8 = 1000) |
| x(2 = 0010) | — | X(4 = 0100) |
| . | | . |
| . | | . |
| . | | . |
| x(13 = 1101) | — | X(11 = 1011) |
| x(14 = 1110) | — | X(7 = 0111) |
| x(15 = 1111) | — | X(15 = 1111) |

Each of these bit-order reversible address generation techniques may be realized by having recourse to software approaches encompassing the algorithm of Table 1 or Table 2 on a general-purpose DSP semiconductor chip. Alternatively, such address generation techniques may be realized by means of hardware configurations incorporating the circuit arrangements of FIGS. 1 and 2 on a special-purpose DSP semiconductor chip. The circuit arrangements herein shown are assumed to be operable for the reversal of the bit orders of three-bit address signals on the basis of an 8-point radix-two FFT algorithm.

Figure 1:
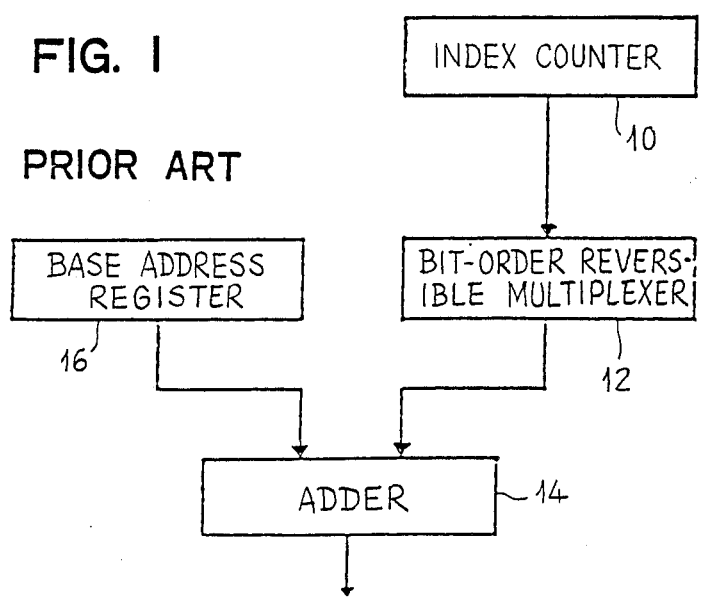
FIG. 1 is a block diagram showing the general circuit arrangement of a prior-art bit-order reversible address generator circuit provided on a DSP semiconductor chip.
Figure 2:
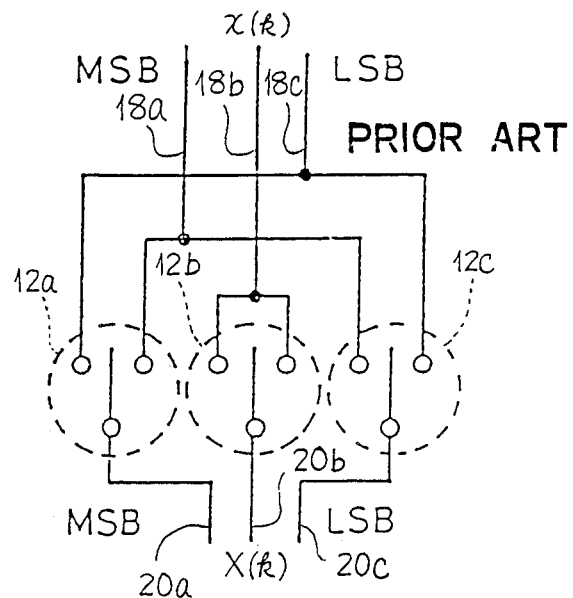
FIG. 2 is a circuit diagram schematically showing an example a bit-order reversible multiplexer network which forms part of the prior-art address generator circuit shown in FIG. 1.

The circuit shown in FIG. 1 includes an index counter 10 for supplying normal bit-order three-bit address signals x(k) to a three-input, three-output bit-order reversible multiplexer 12. When the bit-order reversible multiplexer 12 is operative in a bit-order reversing mode, each of the normal bit-order address signals x(k) can thus be reversed in the order of bits by means of the bit-order reversible multiplexer 12. The resultant signals X(k) with reversed bit orders are supplied to a binary adder circuit 14. To this adder circuit 14 is also supplied from an address register 16 a base address signal provided by, for example, the starting normal bit-order address signal x(0). In response to this normal bit-order base address signal x(0) from the address register 16, the adder circuit 14 outputs a reversed bit-order address signal for access to a certain location of the memory array (not shown). FIG. 2 schematically shows a typical circuit topology of the bit-order reversible multiplexer 12.

As shown in FIG. 2, the bit-order reversible multiplexer 12 consists of three logic-signal steering sections 12a, 12b and 12c each having two inputs and one output. One input to the first steering section 12a and one input to the third steering section 12c are jointly connected to an input line 18a for the most significant bit (MSB) and, likewise, the other input to the first steering section 12a and the other input to the third steering section 12c are jointly connected to an input line 18c for the least significant bit (LSB) of the supplied normal bit-order data signal x(k). Both of the two inputs to the second steering section 12b are connected to a line 18b for the bit intervening between the most and least significant bits of the address signal x(k). The outputs of the first and third steering sections 12a and 12c are connected to output lines 20a and 20c for the most and least significant bits, respectively, of the output signal X(k). The output of the second steering section 12b is connected to an output line 20b for the non-reversed intermediate bit of the address signal X(k).

Whether a software approach or a hardware approach may be used, problems are encountered in conventional bit-order reversed address generation techniques, as follows:

(1) Where a software approach is relied upon for the generation of bit-order reversed address signals on a general-purpose DSP semiconductor chip, large amounts of time and labor are inevitably required for the building of the program to carry out the algorithm for the address generation. Also required is the disproportionately large amount of machine time for the generation of the bit-order reversed address signals.

(2) Difficulties are experienced in fabricating a special-purpose hardware structure on a general-purpose DSP semiconductor chip because of the requirement for the provision of the real estate for the accommodation of such an additional circuit as the bit-order reversible multiplexer of, for example, the configuration illustrated in FIG. 2.

(3) Such a bit-order reversible multiplexer could be used on a special-purpose DSP semiconductor chip but is operable merely for the reversal of data of a fixed bit length and not for the handling of data with any desired number of bits.

(4) A known bit-order reversible multiplexer represented by the multiplexer shown in FIG. 2 requires a large wiring and interconnect area on the semiconductor chip, which therefore could not be designed and fabricated with the design rules used for the fabrication of large-scale integrated (LSI) circuits.

The present invention contemplates provision of a novel method of generating address signals selectively having modified or non-modified bit orders and a bit-order modifiable address generator circuit to put the method into practice on, for example, a general-purpose DSP semiconductor chip. Such a novel address generation technique and the circuit to carry out the technique in accordance with the present invention method will make it possible to have any binary signals or sequences of bits modified into any desired bit patterns such as, for example, bit-order reversed sequences of bits fast and programmably without having recourse to the use of any extra special-purpose signal modifying means.

It should thus be borne in mind that, although the present invention will be hereinafter described as being applied to the generation of address signals providing access to various locations of a semiconductor memory array, the improvements achievable by the present invention may be exploited in generating any other forms of signals for use in microprocessors or in any other forms of signal processing circuits.

DESCRIPTION OF THE PREFERRED EMBODIMENTS

Figure 3:
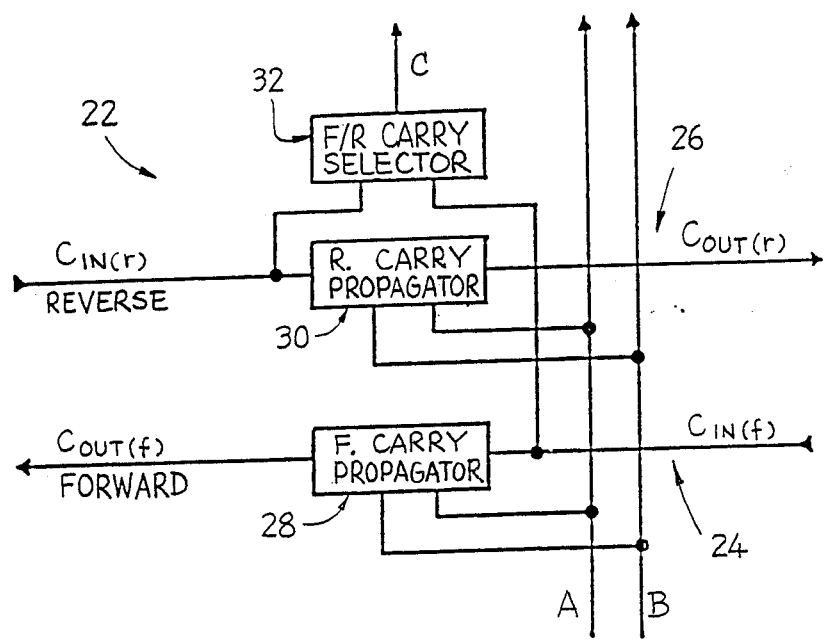
FIG. 3 is a block diagram showing the general circuit arrangement of a carry propagation network incorporated in a binary adder circuit of a bit-order reversible address generator embodying one aspect of the present invention.

FIG. 3 shows a forward/reverse selective carry propagation network which may form part of a bit-order reversible address generator circuit embodying the present invention. As shown, the carry propagation network, designated in its entirety by reference numeral 22, comprises two, forward and reverse, signal carry chains 24 and 26 arranged separately of each other. The forward-carry chain 24 extends from a carry-in line $C_{IN(f)}$ to a carry-out line $C_{OUT(f)}$ through a forward-carry propagator 28 having two control terminals. Similarly, the reverse-carry chain 26 extends from a carry-in line $C_{IN(r)}$ to a carry-out line $C_{OUT(r)}$ through a reverse-carry propagator 30 having two control terminals. One of the control terminals of the forward-carry propagator 28 and one of the control terminals of the reverse-carry propagator 30 are jointly connected to a first input line A, and the other control terminals of the forward-carry and reverse-carry propagators 28 and 30 are jointly connected to a second input line B.

The carry propagation network 22 shown in FIG. 3 further comprises a forward-carry/reverse-carry selector 32 which is operative to provide a choice between the carry-forward and carry-reverse modes of operation in the address generator circuit embodying the present invention. As will be understood more clearly as the description proceeds, bits of suitable operands such as an addend and an augend for the generation of a modified address signal are to be supplied through the first and second input lines A and B, respectively.

In the presence of logic "0" bits on both of these first and second input lines A and B, there will be neither a forward carry toward the most significant stage nor a reverse carry toward the least significant stage of the address generator circuit, thus establishing a carry-kill mode of operation in the shown carry propagation network 22. On the other hand, the presence of a logic "0" bit on one of the first and second input lines A and B and a logic "1" bit on the other input line results in a forward carry to the immediately upper stage or a reverse carry to the immediately lower stage of the address generator circuit. A carry is thus propagated from a less significant bit to a more significant bit or conversely from a more significant bit to a less significant bit in the address signal to be generated, thus establishing a carry-propagate mode of operation in the carry-propagation network 22. In the presence of logic "1" bits on both of the first and second input lines A and B, there will be a forward carry toward or to the most significant stage or a reverse carry toward or to the least significant stage of the address generator circuit, thus producing a pre-charge mode of operation in the carry-propagation network 22. Each of the signal carry chains 24 and 26 is precharged during the precharge mode of operation thus produced in the carry-propagation network 22. Table 3 below is the truth table showing the results of the logic operations which thus proceed in the shown carry propagation network 22. Represented by C in FIG. 3 is a carry-over signal which dictates the forward or reverse carry in the more significant or less significant bit or stage of the circuit.

TABLE 3

| A | 0 | | 0 | | 1 | | 1 | |
|---|---|---|---|---|---|---|---|---|
| B | 0 | | 1 | | 0 | | 1 | |
| $C_{IN}$ | 0 | 1 | 0 | 1 | 0 | 1 | 0 | 1 |
| $C_{OUT}$ | 0 | 0 | 0 | 1 | 0 | 1 | 1 | 1 |

Figure 4:
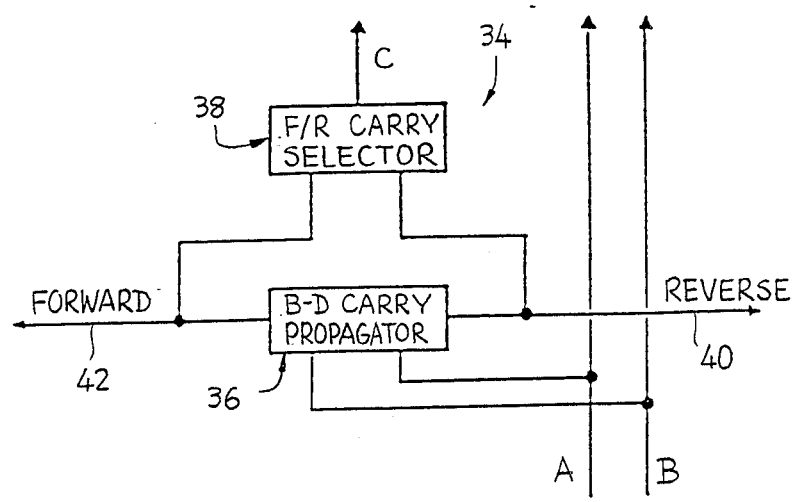
FIG. 4 is a block diagram similar to FIG. 3 but shows an alternative form of carry propagation network which may be incorporated in a binary adder circuit of the bit-order reversible address generator embodying one aspect of the present invention.

In FIG. 4 is shown another form of forward/reverse selective carry propagation network 34 which may also form part of a bit-order reversible address generator circuit according to the present invention. The carry propagation network 34 herein shown features a single carry chain which is operable for both carry-forward and carry-reverse modes of operation. The single carry chain extends through a bidirectional carry propagator 36 provided between carry lines 40 and 42 respectively leading rearwardly and forwardly from the carry propagator 36. The bidirectional carry propagator 36 has two control terminals, one of which is connected to a first input line A and the other of which is connected to a second input line B. A forward-carry/reverse-carry selector 38 is connected across the bidirectional carry propagator 36 through the lines 40 and 42 and is operative to select the direction in which a carry is to be propagated through the carry propagation network 34. Carry-in and carry-out lines are thus provided by the reverse-directed carry line 40 and forward-directed carry line 42, respectively, when a forward carry mode of operation is selected by the selector 38. Conversely, carry-in and carry-out lines are provided by the forward-directed carry line 42 and reverse-directed carry line 40, respectively, when a reverse carry mode of operation is selected by the selector 38.

Each of the forward/reverse selective carry propagation networks 22 and 34 hereinbefore described with reference to FIGS. 3 and 4 can be implemented by a transistor circuitry of metal-oxide-semiconductor field-effect transistor (MOSFET) configuration advantageously for its potential high-speed performance and to enable the memory system to operate efficiently. Thus, the carry propagation network 22 of the type shown in FIG. 3 can be implemented readily by fabricating the forward-carry/reverse-carry selector 32 in the form of a MOSFET circuit combined with known carry propagators used as the forward-carry and reverse-carry propagators 28 and 30 of the carry propagation network 22. Each of the bidirectional carry propagator 36 and the forward-carry/reverse-carry selector 38 of the carry propagation network 34 shown in FIG. 4 can also be easily realized by a combination of MOSFET devices. A MOSFET device is an inherently bi-directional device with the direction of current being dependent upon the relationship between the magnitudes of the voltages applied to the two source/drain diffusion regions of the device.

Figure 5:
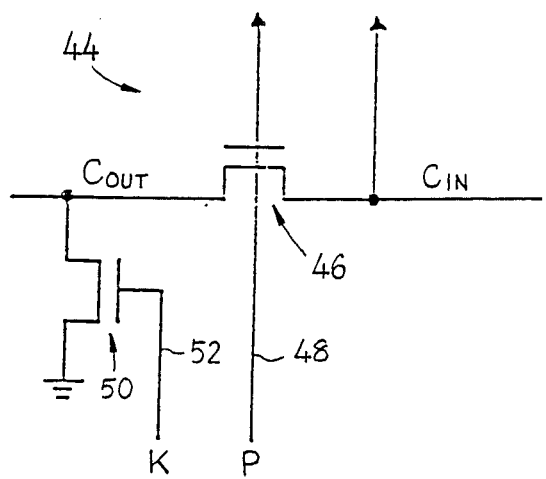
FIG. 5 is a view showing an example of the MOSFET circuit arrangement operable as a carry-over circuit in the carry propagation network shown in FIG. 4.

FIG. 5 shows an example of a carry-over circuit of MOSFET configuration for use in the carry propagation network 34 shown in FIG. 4. The carry-over circuit, represented in its entirety by reference numeral 44, is well known in the art as Manchester carry chain and extends through a pass transistor 46 from a carry-in line $C_{IN}$ to a carry-out line $C_{OUT}$. The pass transistor 46 has its gate connected through a line 48 to a supply source of a carry-propagate signal P $(=A*B)$. The carry-propagate signal P is effective in creating the carry-propagate mode of operation in the address generator circuit under consideration. On the other hand, the carry-out line $C_{OUT}$ is connected to a ground line across a carry-kill control transistor 50 having its gate connected to a supply source of a carry-kill signal $K=(\overline{A}*\overline{B})$ through a line 52. The carry-kill signal K is effective in creating the carry-kill mode of operation and is thus exclusive in effect to the carry-propagate signal P. In the presence of the carry-propagate signal P on the gate of the pass transistor 46, a carry forward to the immediately upper bit or backward to the immediately lower bit is allowed to pass through the pass transistor 46. The carry-kill signal K, when present at the gate of the carry-kill control transistor 50, is predominant over a carry toward the most significant bit or a carry toward the least significant bit.

Figure 6:
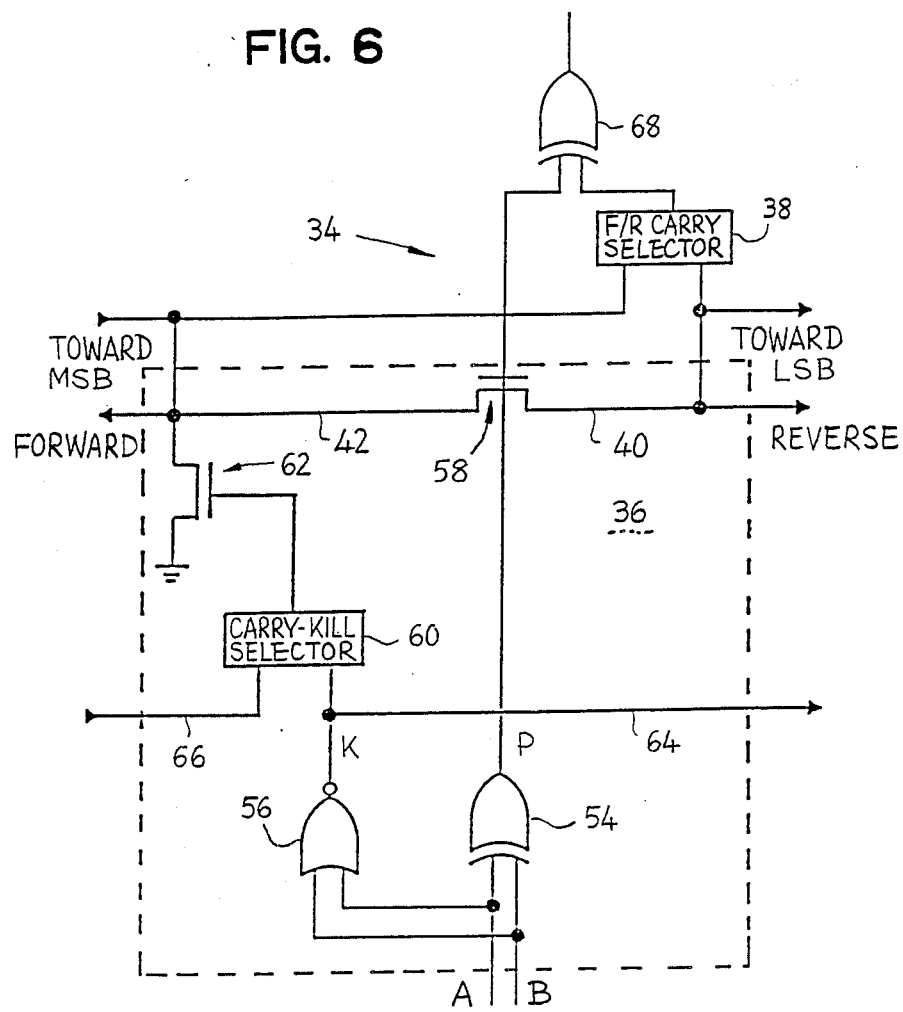
FIG. 6 is a circuit diagram schematically showing the detailed circuit arrangement of the carry propagation network shown in FIG. 4, viz., the arrangement in which the bidirectional carry propagator forming part of the network is used in combination with the carry-over circuit illustrated in FIG. 5.

FIG. 6 shows an example of the MOSFET circuit arrangement operable as the bidirectional carry propagator 24 with which the carry-over circuit 44 thus constructed may be used together to form the carry propagation network 34 shown in FIG. 4. The bidirectional carry propagator 36 comprises a parallel combination of a two-input logic exclusive-OR gate 54 and a two-input logic NOR gate 56, each has its two inputs connected to input lines A and B. The logic exclusive-OR gate 54 has its output connected to the gate of a pass transistor 58 provided between the forward-carry and reverse-carry lines F and R of the bidirectional carry chain shown in FIG. 4. The pass transistor 58 has one of its source/drain terminals connected to the reverse-directed carry line 40 and the other of the source/drain terminals connected to the forward-directed carry line 42. The transistor 58 receives a carry-propagate signal P in the presence of a logic "1" bit on one input terminal of the exclusive-OR gate 54 and a logic "0" bit on the other input terminal of the gate 54. On the other hand, the logic NOR gate 56 has its output connected to one control terminal of a carry-kill selector 60 which has output terminal connected to the gate of a carry-kill control transistor 62. The carry-kill control transistor 62 is shown having its source/drain terminals connected between the forward-directed carry line 42 and ground and receives a carry-kill signal K in the presence of logic "0" bits concurrently on both of the two input terminals of the NOR gate 56. The two input terminals of the carry-kill selector 60 which include the input terminal connected to the output of the NOR gate 56 are connected to carry-kill control lines 64 and 66 as shown. Though not shown in the drawings, the carry-kill control line 64 leads to the input terminal of the carry-kill selector of the lower bit or stage of the circuit and the carry-kill control line 66 leads to the input terminal of the carry-kill selector of the upper bit or stage of the circuit.

In the circuit arrangement shown in FIG. 6, the forward-carry/reverse-carry selector 38 has its input terminals connected to the signal carry chain across the pass transistor 58. The pass transistor 58 on the signal carry chain has its gate connected, to one input terminal of a two-input logic exclusive-OR gate 68, and the other input terminal of which is connected to the carry selector 38.

Figure 7:
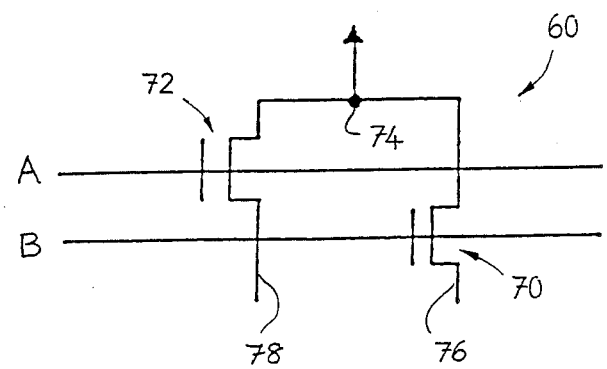
FIG. 7 is a circuit diagram showing a MOSFET transfer-gate circuit which may implement the carry-kill selector included in the bidirectional carry propagator shown in FIG. 6.

Each of the forward-carry/reverse-carry and carry-kill selectors 38 and 60 forming part of the bidirectional carry propagator 36 are constructed and arranged as hereinbefore described by a MOSFET transfer-gate circuit, the simplified circuit topology of which is shown in FIG. 7. The transfer-gate circuit of FIG. 7 comprises first and second transistors 70 and 72 each having its source/drain terminals connected between a common node 74 and lines 76 and 78, respectively. The gates of the transistors 70 and 72 are connected to the first and second input lines A and B as in that the logic signals to appear on the lines 76 and 78 are exclusive to each other so that either the first input line A or the second input line B is selected to be active depending upon the logical relationship between the signals to be applied to the lines 76 and 78.

Figures 8, 9A, 9B:
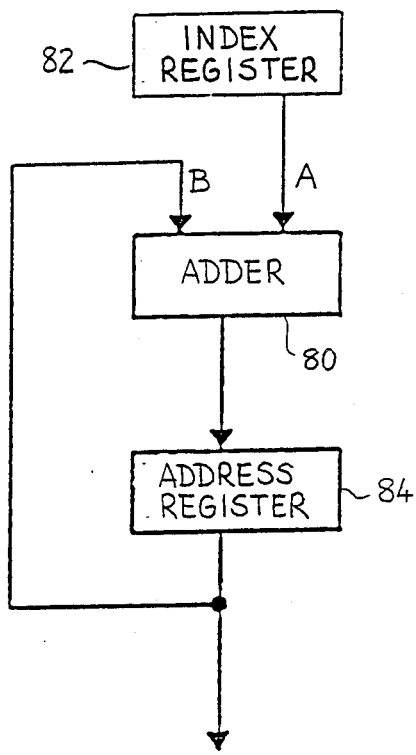
FIG. 8 is a block diagram schematically showing a bit-order reversible address generator circuit embodying the present invention, the circuit using the forward-reverse selective carry propagation network of FIG. 3 or FIG. 4.
FIGS. 9a and 9b are views showing the forward-carry and reverse-carry binary addition rules, respectively, which are used in producing modified address signals in the bit-order reversible address generator circuit shown in FIG. 8.

FIG. 8 shows the general circuit topology of a bit-order reversible address generator circuit embodying the present invention. The address generator circuit herein shown is assumed to be operable for generating four-bit address signals and may use either of the forward/reverse selective carry propagation networks 22 and 34 shown in FIG. 3 and FIG. 4, respectively. As shown, the address generator circuit comprises a bit-order reversible binary adder circuit 80 which is, by way of example, assumed to be provided by the combination of a known type of multi-stage adder/subtractor (not shown) used in a conventional bit-order reversible address generator and the forward/reverse selective carry propagation network 22 or 34 of FIG. 3 or FIG. 4. It is in this instance important that the multi-stage adder/subtractor herein used have functions to carry out both a forward arithmetic addition from the least significant bits forward and a reverse arithmetic addition from the most significant bits backward. The forward/reverse selective carry propagation network 22 or 34 selects one of these two modes of addition. The binary adder circuit 80 is connected on its input side to output terminals of a four-bit index register 82 through bus lines A and on its output side to input terminals of a four-bit address register 84. The address register 84 in turn is operative to provide a bit-order reversed or non-reversed address signal as an output signal of the address generator circuit herein shown. The bit-order reversed or non-reversed address signal thus output from the address register 84 is fed back to and referenced by the adder circuit 80 through bus lines B. The bus lines A and B herein shown correspond to the input and output lines A and B, respectively, which have been shown in FIGS. 3, 4, 6 and 7. The index signal from the index register 82 and the address signal generated by the address register 84 and fed back to the adder circuit 80 thus correspond to the previously mentioned addend and augend for the generation of a modified address signal. The adder circuit 80 is operative to supply an output address signal to the address register 84 as the output from the exclusive-OR gate 68 of the circuit shown in FIG. 6.

Description will now be made regarding the different modes of operation of the bit-order reversible address generator circuit thus constructed and arranged in accordance with the present invention. For convenience of description it will be assumed that bit sequences X(k) of four-bit length with normal bit orders on a time axis are used as data vectors in carrying out a 16-point radix-two FFT algorithm.

Prior to the start of the address generating operation, a data vector or bit sequence (0000) representative of the decimal number "1" is loaded as a modifier index address into the index register 82 while a suitable base address such as for example the starting address (0000="0") is loaded into the address register 84. The forward-carry/reverse-carry selector 32 of the network 22 shown in FIG. 3 or the forward-carry/reverse-carry selector 38 of the network 34 shown in FIG. 4 is first assumed to be conditioned to select the forward carry for performing a succession of binary arithmetic additions from the least significant adder stage or bit onward as exemplified in FIG. 9a.

The starting address X(0=0000) loaded into the address register 84 is fed back to the bit-order reversible adder circuit 80, which therefore produces the sum (0001="1") of the starting address and the modifier index address (0001) from the index register 82 as indicated in FIG. 10a. The result of the arithmetic addition is provided as the second address X(1=0001) at the output terminal of the address register 84 and is fed back to the adder circuit 80. The adder circuit 80 now produces the sum (0010="2") of the index address (0001) from the index register 82 and the second address X(1=0001) fed back from the address register 84. Such additions proceed successively as shown in FIG. 10a until an iteration of a total of sixteen arithmetic additions is complete with the generation of the sixteenth address X(15=1111) as the result of the addition between the index address (0001) from the index register 82 and the fifteenth address X(14=1110) fed back from the address register 84 as shown in FIG. 10a.

To perform the bit-order reversed address generation thereafter, a modifier index address representative of the decimal number corresponding to one half of the number of the sample points set in the FFT algorithm in use is loaded into the index register 82. The sample points of the FFT algorithm herein being herein assumed to be 16 in number, the bit sequence (1000) representative of the decimal number "8" is loaded as a fixed modifier index address into the index register 82. In the address register 84 is maintained the base address provided by the starting address (0000="0"). The forward-carry/reverse-carry selector 22 of the network 22 shown in FIG. 3 or the forward-carry/reverse-carry selector 38 of the network 34 shown in FIG. 4 is now conditioned to select the reverse carry for performing a succession of binary arithmetic additions from the most significant adder stage or bit downward as exemplified in FIG. 9b.

The starting address X(0=0000) loaded into the address register 84 is fed back to the bit-order reversible adder circuit 80, which therefore produces the sum (1000="8") of the starting address and the modifier index address (1000) from the index register 82 as indicated in FIG. 10b. The result of the arithmetic addition is provided as the second address X(8=1000) at the output terminal of the address register 84 and is fed back to the adder circuit 80. The adder circuit 80 now produces the sum (0100="4") of the index address (1000) from the index register 82 and the second address X(8=1000) fed back from the address register 84. The successive add operations proceed as shown in FIG. 10b until an iteration of sixteen arithmetic additions is complete with the generation of the sixteenth address X(15=1111) as the result of the addition of the index address (1000) from the index register 82 and the fifteenth address X(7=0111) fed back from the address register 84 as shown in FIG. 10b.

As will have been understood from the foregoing description the address generation techniques proposed by the present invention are characterized inter alia in the following respects:

(1) The bit-order reversible adder circuit 80 of the address generator circuit can be realized by mere addition of the forward/reverse selective carry propagation network 22 or 34 of FIG. 3 or FIG. 4 to a known type of adder/subtractor configuration which forms part of a conventional general-purpose address generator circuit.

(2) Such a bit-order reversible adder circuit 80 is operable for the generation of both bit-order reversed and non-reversed addresses by iterations of simple arithmetic additions according to ordinary forward or backward binary addition rules. Generation of the bit-order reversed or non-reversed addresses is effected selectively under the control of the forward-carry/reverse-carry selector 32 forming part of the network 22 shown in FIG. 3 or the forward-carry/reverse-carry selector 38 included in the network 34 shown in FIG. 4.

(3) The bit-order reversed addresses can be generated quickly and efficiently simply by feeding back the address output from the address register 84 to the binary adder circuit 80 during each cycle of address generating operation.

(4) The modifier index address to be loaded into the index register 82 and used as the addend in the arithmetic addition can be selected arbitrarily from among the various candidates which are equal in number to the sample points set in the FFT algorithm used. Where a 16-point FFT algorithm is to be used as in the described embodiment of the invention, the index address to be loaded into the index register 82 can thus be selected from among the total of sixteen candidates (0000), (0001), (0010), (1111) for the generation of both the bit-order reversed addresses and nonreversed addresses. The bit patterns of the address signals can therefore be programmably modified by selection of any of the sixteen index addresses without having recourse to the provision of any extra hardware configurations.

(5) The number of the candidates available for the selection of the index address is dictated merely by the number of the sample points to be used in the FFT algorithm to be executed. The number of the bits to form each of the address signals to be generated by the address generation circuit embodying the present invention can be selected arbitrarily by selection of the sample points to be used in the FFT algorithm.

In this connection it has been described that the index address to be used in performing the bit-order reversed address generation is selected to be representative of the decimal number corresponding to one half of the number of the sample points set in the FFT algorithm to be used. Such an index address may however be substituted by an address selected depending upon the used rules of allocation of the data to the memory array. Where, for example, two-word data signals such as those representative of complex numbers are to be processed, one first (1/1) of the number of the sample points of the FFT algorithm used, viz., the point number of the FFT algorithm per se may be used as the decimal number to represent the modifier index address.

(6) The improved address generation techniques according to the present invention can b implemented readily and economically by a hardware structure which may be composed of a sufficiently small number of semiconductor devices on, typically, a general-purpose DSP chip.

What is claimed is:

1. A method of generating binary signals comprising:
   (a) storing in a first memory, binary index signal comprising a sequence of a predetermined number of bits,
   (b) storing in a second memory, a binary base signal comprising a sequence of said predetermined number of bits,
   (c) carrying out a reverse arithmetic addition from the most significant bits of said index signal and said base signal for producing an initial output signal representative of the arithmetic sum of the index and base signals during an initial cycle of signal generating operation,
   (d) Storing said initial output signal in said second memory and adding the initial output signal to said index signal to produce an output signal differing in bit pattern from said initial output signal during the cycle of signal generating operation immediately subsequent to said initial cycle and storing the last named output signal in said second memory, and
   (e) thereafter carrying out a reverse arithmetic addition of said index signal from said first memory and the output signal produced during each of the successive cycles of signal generating operation to produce another signal differing in bit pattern from each of the output signals produced during the immediately preceding cycle of signal generating operation.

2. A method of sequentially generating binary address signals comprising:
   (a) storing in a first register, a binary index signal comprising a sequence of a predetermined number of bits,
   (b) storing in a second register, a binary base address signal comprising a sequence of said predetermined number of bits,
   (c) carrying out a reverse arithmetic addition from the most significant bits of said index signal and said base address signal for producing an initial output address signal representative of the arithmetic sum of the index and base address signals during an initial cycle of signal generating operation,
   (d) storing said initial output address signal in said second register and adding the initial output address signal to said index signal for producing an output address signal differing in bit pattern from said initial output address signal during the cycle of signal generating operation immediately subsequent to said initial cycle and storing the last named output address signal in said second register, and
   (e) thereafter carrying out a reverse arithmetic addition of said index signal from said first register and the output address signal produced during each of the successive cycles of signal generating operation for producing another output address signals produced during the immediately preceding cycle of signal generating operation.

3. A bit-order modifiable signal generator circuit, comprising
   (a) an adder circuit comprising the combination of a binary multi-stage adder/subtractor and a forward-reverse selective carry propagation network, the multi-stage adder/subtractor having functions to carry out both a forward arithmetic addition from the least significant bits forward and a reverse arithmetic addition from the most significant bits backward selectively under the control of said forward/reverse selective carry propagation network,
   (b) an index register operable for having programmably yet fixedly stored therein a binary index signal comprising a sequence of a predetermined number of bits, and
   (c) a signal register operable for having programmably yet fixedly stored therein a binary base signal comprising a sequence of said predetermined number of bits,
   (d) said adder circuit being responsive to the index signal output from said index register and to a binary signal output from said signal register for producing an output signal representative of the arithmetic sum of the index signal and the signal output from the signal register during each cycle of signal generating operation, and
   (e) said signal register being responsive to said output signal from said adder circuit for tentatively storing the output signal from the adder circuit and feeding back the signal to said adder circuit for being arithmetically added to said index signal during each cycle of signal generating operation.

4. The bit-order modifiable signal generator circuit according to claim 3 wherein the forward-reverse selective carry propagation network comprises:
   a reverse propagator for propagating a reverse carry;
   a forward propagator for propagating a forward carry; and
   a forward-reverse selector circuit operatively connected to the reverse propagator and the forward propagator for selecting the reverse propagator and the forward propagator.

5. The bit-order modifiable signal generator circuit according to claim 3 wherein the forward-reverse selective carry propagation network comprises:
   a bi-directional carry propagator for propagating a forward carry and a reverse carry; and
   a forward-reverse selector circuit operatively connected to said bi-directional carry propagator for selecting the reverse carry and the forward carry.

6. A bit-order modifiable address generator circuit having functions to perform a fast Fourier transform algorithm with a predetermined number of sample points set therein, comprising
   (a) an adder circuit comprising the combination of a binary multi-stage adder/subtractor and a forward-reverse selective carry propagation network, the multi-stage adder/subtractor having functions to carry out both a forward arithmetic addition from the least significant bits forward and a reverse arithmetic addition from the most significant bits backward selectively under the control of said forward/reverse selective carry propagation network, (b) an index register operable for having programmably yet fixedly stored therein a binary index address signal comprising a sequence of a predetermined number of bits, the predetermined number of bits being uniquely determined depending upon said predetermined number of sample points set in said fast Fourier transform algorithm, and (c) an address register operable for having programmably yet fixedly stored therein a binary base address signal comprising a sequence of said predetermined number of bits, (d) said adder circuit being responsive to the index address signal output from said index register and to a binary address signal output from said address register for producing an output address signal representative of the arithmetic sum of the index address signal and the address signal output from the address register during each cycle of address generating operation, and (e) said address register being responsive to said output address signal from said adder circuit for tentatively storing the output address signal from the adder circuit and feeding back the address signal to said adder circuit for being arithmetically added to said index address signal during each cycle of address generating operation.

7. The bit-order modifiable address generator circuit according to claim 6 wherein the forward-reverse selective carry propagation network comprises:
a reverse propagator for propagating a reverse carry;
a forward propagator for propagating a forward carry; and
a forward-reverse selector circuit operatively connected to the reverse propagator and the forward propagator for selecting the reverse propagator and the forward propagator.

8. The bit-order modifiable address generator circuit according to claim 6 wherein the forward-reverse selective carry propagation network comprises:
a bi-directional carry propagator for selectively propagating a forward carry and a reverse carry; and
a forward-reverse selector circuit operatively connected to the bidirectional carry propagator for selecting the reverse carry and the forward carry.

9. A bit-order modifiable generator circuit comprising:
an adder comprising a multistage adder circuit and a forward reverse selective carry propagation network, the multistage adder circuit including means for selectively performing a reverse arithmetic addition from the most significant bits selectively under the control of the forward-reverse select carry propagation network;
a first register having stored therein a first signal having a predetermined number of bits and the first register being operatively connected to provide a first input to the adder; and
a second register operatively connected to receive and store a sum signal from the adder, to provide a second input to the adder and to provide as an output the generated bit-order modified signal.

10. The bit-order modifiable signal generator circuit according to claim 9 wherein the multistage adder circuit further includes means, selectively controlled by the forward-reverse selective carry propagation network, for selectively performing a forward arithmetic addition from the least significant bits.

11. The bit-order modifiable signal generator circuit according to claim 10 wherein the forward-reverse selective carry propagation network comprises:
a reverse propagator for propagating a reverse carry;
a forward propagator for propagating a forward carry; and
a forward-reverse selector circuit operatively connected to the reverse propagator and the forward propagator for selecting the reverse propagator and the forward propagator.

12. The bit-order modifiable signal generator circuit according to claim 10 wherein the forward-reverse selective carry propagation network comprises:
a bi-directional carry propagator for propagating a forward carry and a reverse carry; and
a forward-reverse selector circuit operatively connected to the bi-directional carry propagator for selecting the reverse carry and the forward carry.

13. The bit-order modifiable signal generator circuit according to claim 9 wherein both said first and second registers are programmable.

14. The bit-order modifiable signal generator circuit according to claim 9 wherein the generated bit-order modified signal is an address signal for use in performing a fast Fourier transform algorithm.

* * * * *